United States Patent [19]

Durward et al.

[11] Patent Number: 5,659,691
[45] Date of Patent: Aug. 19, 1997

[54] VIRTUAL REALITY NETWORK WITH SELECTIVE DISTRIBUTION AND UPDATING OF DATA TO REDUCE BANDWIDTH REQUIREMENTS

[75] Inventors: James Durward; Jonathan Levine; Michael Nemeth; Jerry Prettegiani; Ian T. Tweedie, all of Calgary, Canada

[73] Assignee: Virtual Universe Corporation, Calgary, Canada

[21] Appl. No.: 125,950

[22] Filed: Sep. 23, 1993

[51] Int. Cl.$^6$ .................. G06F 3/14; G06F 15/163; G06F 3/16
[52] U.S. Cl. .................. 395/329; 395/615; 395/200.34; 395/978
[58] Field of Search .................. 395/600, 154, 395/155, 119, 152, 162, 326, 329, 511, 501, 502, 526, 339, 200.09, 335, 978; 364/578, 514 A

[56] References Cited

U.S. PATENT DOCUMENTS

| | | | |
|---|---|---|---|
| 3,983,474 | 9/1976 | Kuipers | 324/43 R |
| 4,017,858 | 4/1977 | Kuipers | 343/100 R |
| 4,406,532 | 9/1983 | Howlett | 354/114 |
| 4,479,195 | 10/1984 | Herr et al. | 364/900 |
| 4,540,850 | 9/1985 | Herr et al. | 179/2 DP |
| 4,542,291 | 9/1985 | Zimmerman | 250/231 R |
| 4,640,989 | 2/1987 | Riner et al. | 379/94 |
| 4,710,870 | 12/1987 | Blackwell et al. | 364/200 |
| 4,714,989 | 12/1987 | Billings | 364/200 |
| 4,734,934 | 3/1988 | Boggs | 379/202 |
| 4,757,714 | 7/1988 | Purdy et al. | 73/597 |
| 4,796,293 | 1/1989 | Blinken et al. | 379/202 |
| 4,937,444 | 6/1990 | Zimmerman | 250/231.1 |
| 4,945,305 | 7/1990 | Blood | 324/207.17 |
| 4,984,179 | 1/1991 | Waldern | 364/514 |
| 4,988,981 | 1/1991 | Zimmerman et al. | 340/709 |
| 5,001,628 | 3/1991 | Johnson et al. | 364/200 |
| 5,003,300 | 3/1991 | Wells | 340/705 |
| 5,021,976 | 6/1991 | Wexelblat et al. | 364/521 |
| 5,275,565 | 1/1994 | Moncrief | 434/29 |
| 5,307,456 | 4/1994 | MacKay | 395/154 |
| 5,310,349 | 5/1994 | Daniels et al. | 434/350 |
| 5,322,441 | 6/1994 | Lewis et al. | 364/578 |
| 5,381,158 | 1/1995 | Takahara et al. | 395/600 |
| 5,469,511 | 11/1995 | Lewis et al. | 381/173 |
| 5,495,576 | 2/1996 | Ritchey | 395/125 |
| 5,588,139 | 12/1996 | Lanier et al. | 395/500 |

FOREIGN PATENT DOCUMENTS 0 479 422 A2  4/1992  European Pat. Off. .
WO 94/17860  8/1994  WIPO .

OTHER PUBLICATIONS

"Europe Is Bursting With Virtual Reality Ideas", Computergram International, Jan. 1993.

(List continued on next page.)

*Primary Examiner*—Thomas G. Black
*Assistant Examiner*—Jack M. Choules
*Attorney, Agent, or Firm*—Townsend and Townsend and Crew LLP

[57] ABSTRACT

A virtual reality system has a database for defining one or more three-dimensional virtual spaces. A communication unit establishes a communication between the database and a user, and a data communication unit communicates data from the database to the user so that the user's computer may display a portion of a selected virtual space on the user's head mounted display. The communications unit also receives data corresponding to the position, orientation, and/or movement of the user relative to a reference point and uses the data to define a virtual being within the virtual space, wherein the position, orientation, and/or movements of the virtual being are correlated to the received data. Preferably, the data communicated to the user typically corresponds to the portion of the virtual space viewed from the perspective of the virtual being. To reduce the amount of data communicated between the computer and each user, visual and sound priority spaces may be defined within the portion of the virtual space data communicated to the user, and elements within selected priority spaces may be updated in priority over other priority spaces.

15 Claims, 4 Drawing Sheets

VISUAL RELEVANT SPACES AND PRIORITY SPACES

OTHER PUBLICATIONS

"Virtual Audio Finally Sounds Like Music to the Ears", Electronic Engineering Times Oct. 1992.

Scarborough, E., "Enhancement or Audio Localization Cue Synthesis by Adding Enviromental and Visual Clues.", NTIS Dec. 1992.

"W Industries Makes Virtual Reality a Reality at #20,000" Computergram International Mar. 1991.

Michael Snoswell, Overview of Cyberterm, a Cyberspace Protocol Implementation, from the World Wide Web at http://www.cs.uidaho.edu/lal/cyberspace/VR/docs/Snoswell.Cyberterm. Jul. 1992.

Kamae, T. "Development of a public facsimile communication system using storage and conversion techniques," IEEE National Telecommunications Conference, Houston, TX (30 Nov. –4 Dec. 1980), pp. 19.4.1 through 19.4.5.

CHI'92 Conference Proceedings, ACM Conference on Human Factors in Computing Systems, May 1992, Monterey, CA, pp. 329–334, Codella, C., et al. "Interactive Simulation in a Multi–Person Virtual World."

Machine design, vol. 62, No. 24, Nov. 1990, Cleveland, US, pp. 40–41, "3D Sound Points Pilots Towards The Enemy."

Proceedings 1990 Symposium on INteractive 3D Graphics, Mar. 1990, Utah, USA, pp. 35–36, Blancard, C., et al., "Reality Built For Two: A Virtual Reality Tool."

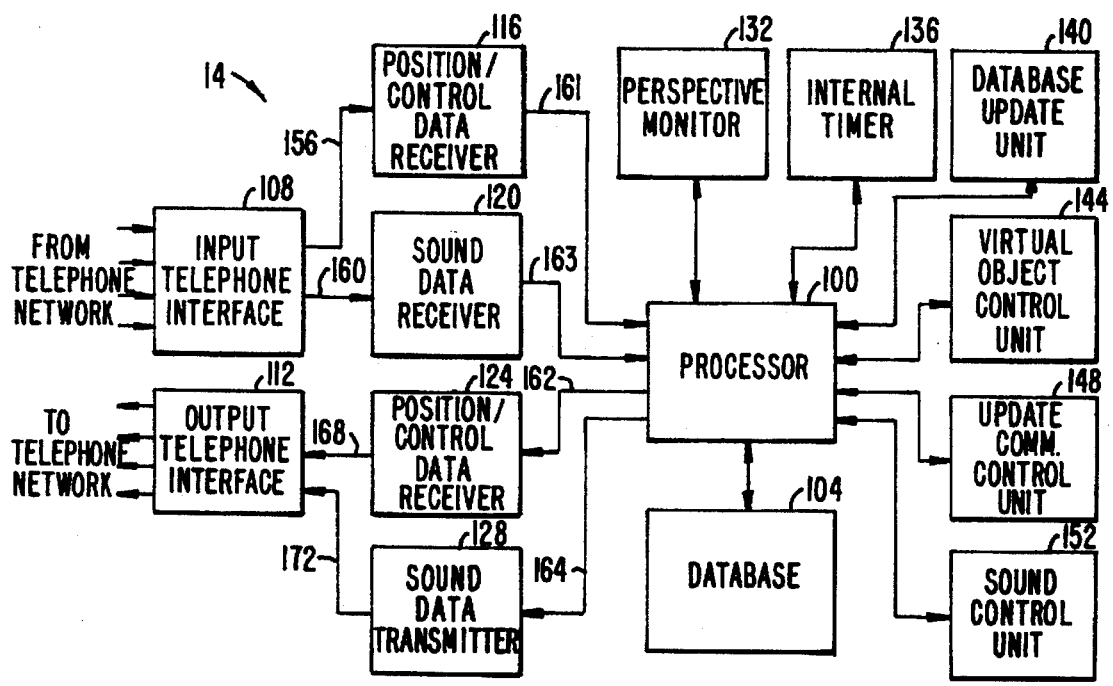
FIG. 2.
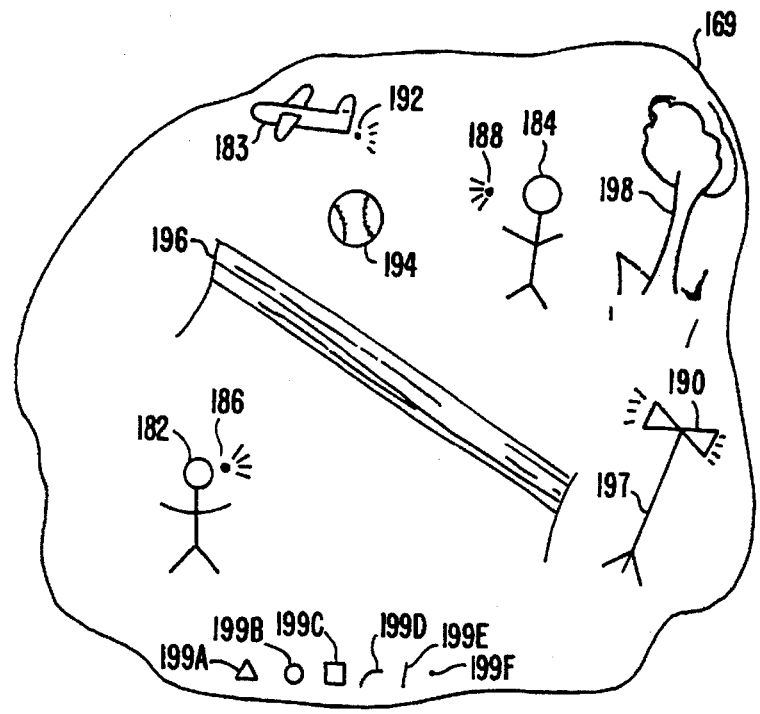
FIG. 3.
FIG. 4.

VISUAL RELEVANT
SPACES AND PRIORITY
SPACES

SOUND RELEVANT SPACES
AND PRIORITY SPACES

VIRTUAL REALITY NETWORK WITH SELECTIVE DISTRIBUTION AND UPDATING OF DATA TO REDUCE BANDWIDTH REQUIREMENTS

BACKGROUND OF THE INVENTION

This invention relates to virtual reality systems and, more particularly, to a virtual reality network wherein multiple users at remote locations may telephone a central communications center and participate in a virtual reality experience.

Virtual reality systems are computer controlled systems which simulate artificial worlds and which allow users to experience and interact with the artificial worlds as if the users actually existed within them. Examples of virtual reality systems and components are disclosed in U.S. Pat. Nos. 4,542,291; 4,017,858; 4,945,305; 3,983,474; 4,406,532; 5,003,300; 4,984,179; 4,988,981; and 4,757,714; all of which are incorporated herein by reference. The typical virtual reality system includes a computer, a head-mounted display for displaying an artificial world to the user, and instrumentation for sensing the position and orientation of the user with respect to the computer or some other reference point. The artificial world is defined within the computer's database. Instrumentation data is communicated to the computer, and the computer creates a virtual being within the artificial world which emulates the position, orientation, and movements of the user. The computer then communicates graphical data to the head-mounted display which then displays the artificial world from the perspective of the virtual being. By gesturing in an appropriate manner, the user may interact with virtual objects within the artificial world as if they were real. For example, the user may drive an artificial automobile, throw an artificial ball, etc.

Although virtual reality has proven to be an exciting new technology, it is also a very expensive one. Most virtual reality hardware is located at universities and government agencies, although some virtual reality arcades have been built in major shopping centers located in large cities for playing a few basic games. Still, access to sophisticated virtual reality systems has been extremely limited and is often not available to the general public without great inconvenience.

SUMMARY OF THE INVENTION

The present invention is directed to a virtual reality system wherein multiple users located at different remote physical locations may communicate with the system via conventional dialup telephone lines and may perform independent and/or interactive/collaborative tasks within the system, aided by inter-user audio communications.

In one embodiment of the present invention, the virtual reality system has a central database for defining one or more three-dimensional virtual spaces. A communication unit establishes a communication between the database and a user, and a data communication unit communicates data from the database to the user so that the user's computer may display a portion of a selected virtual space on the user's head mounted display. The communications unit also receives data corresponding to the position, orientation, and/or movement of the user relative to a reference point and uses the data to define a virtual being within the virtual space, wherein the position, orientation, and/or movements of the virtual being are correlated to the received data. Preferably, the data communicated to the user typically corresponds to the portion of the virtual space viewed from the perspective of the virtual being.

The system defines other virtual beings within the database in response to position, orientation, and/or movement data received from other users, and the portions of the virtual space communicated to the other users may correspond to the perspectives of their associated virtual beings. The system periodically updates the database and communicates the updated portions of the virtual space to the users to reflect changes in the position of moving objects within the virtual space. To further reduce the amount of data communicated between the computer and each user, priority spaces may be defined within the portion of the virtual space data communicated to the user, and elements within selected priority spaces may be updated in priority over other priority spaces.

The system also supports audio communication with the users. Sounds may be defined within the virtual space, and data correlated to the sounds may be communicated to the users. Additionally, the communications unit may receive sounds from each user and then communicate the sounds to the other users to facilitate verbal or other audio communication among the users. The sounds may be assigned origins within the virtual space, and a sound control unit may then send data to each user for simulating the origin of the sound within the virtual space. The sounds may be assigned to sound priority spaces so that the amplitudes of sounds assigned to a particular priority space may be varied relative to the amplitudes of sounds in other priority spaces.

BRIEF DESCRIPTION OF THE DRAWINGS

FIG. 2 is a block diagram of a particular embodiment of the central control unit shown in FIG. 1;

FIG. 3 is a block diagram illustrating how the database shown in FIG. 2 is partitioned into multiple virtual spaces;

FIG. 4 is a diagram illustrating a particular embodiment of a virtual space according to the present invention;

DETAILED DESCRIPTION OF THE PREFERRED EMBODIMENTS

Figure 1:
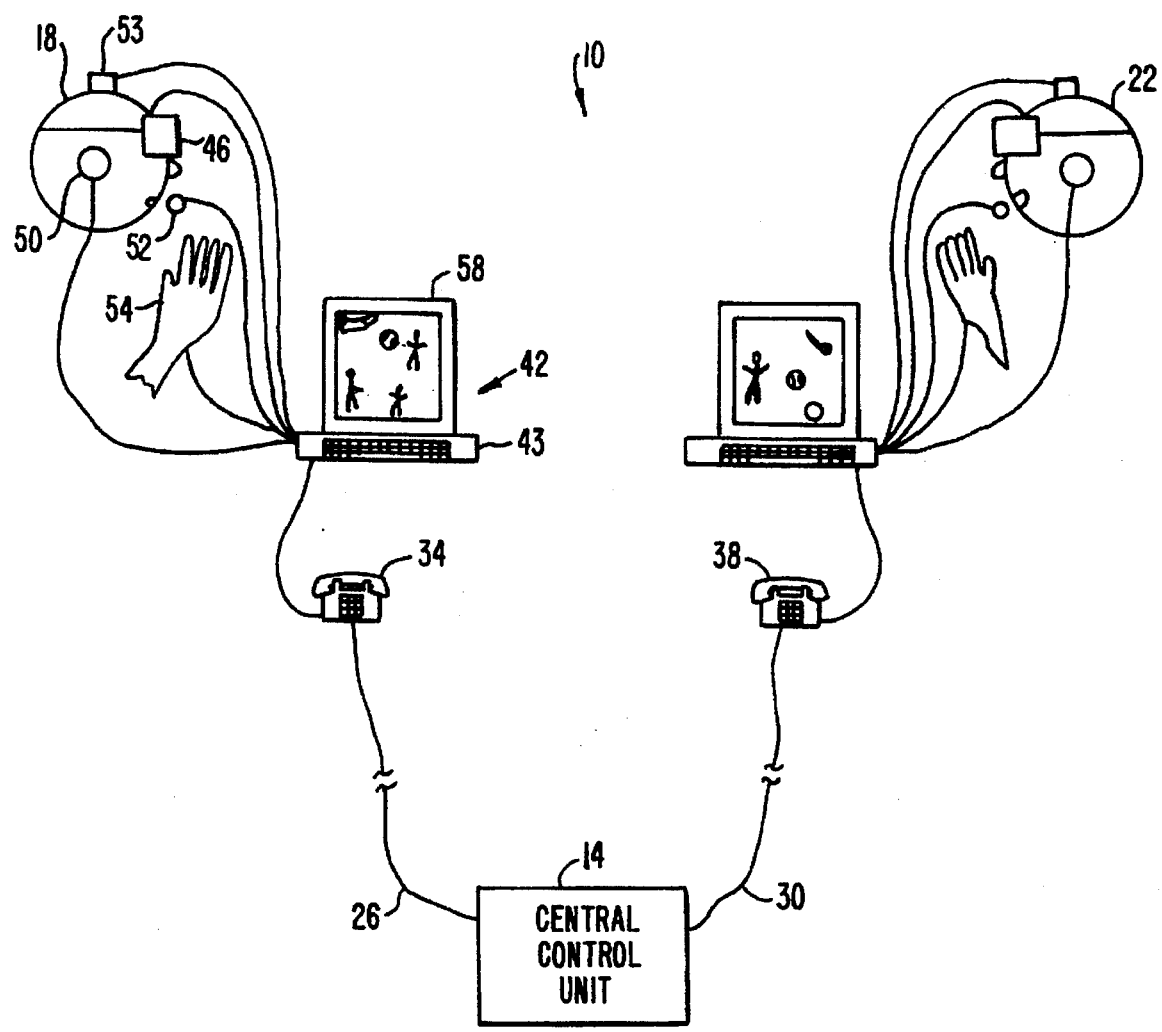
FIG. 1 is diagram of a particular embodiment of a virtual reality network according to the present invention.

FIG. 1 is a diagram illustrating a particular embodiment of a virtual reality network 10 according to the present invention. Network 10 includes a central control unit 14 for communicating with a plurality of users, e.g., users 18 and 22, through a public telephone system represented by dialup telephone lines 26 and 30 coupled to telephones 34 and 38, respectively. Although telephone lines 26 and 30 have been shown as single lines, each may comprise multiple lines wherein one or more lines may be used for virtual object or virtual space data and other lines may be used for audio data. Furthermore, the present invention is not limited to telephone communications. Any data transmission network may suffice. For example, network 10 may comprise high speed digital communication lines, cable broadcasting communication lines, etc. The number of users supported by network 10 is not limited to the two shown. Any number of users, even thousands, may be supported.

Typically, user 18 is equipped with a computer 42, a head-mounted display 46, earphones 50, a microphone 52, a head position sensor 53, and an instrumented garment 54. User 22 is ordinarily equipped in the same manner. Computer 42 may include a keyboard 43 for entering control information. Computer 42 may also include a monitor 58 for displaying control information or the virtual space viewed by user 18, but it should be understood that the primary display of the virtual space to user 18 is preferably accomplished by head-mounted display 46. Alternatively, head-mounted display may be substituted in some applications by a stand-alone display unit which realistically displays the virtual space to the user. Earphones 50 receive sounds associated with the displayed virtual space from central control unit 14 via computer 42, and microphone 52 communicates sounds from user 18 via computer 42 to central control unit 14 which, in turn, merges the sounds received into the virtual space. Head position sensor 53 senses the position and/or orientation of the user's head relative to computer 42 or some other reference point and communicates the positional data to computer 42 which, in turn, communicates the data to central control unit 14. Instrumented garment 54 is shown as a glove in this embodiment, but other instrumented garments such as shirts, pants, or full-body suits may be used as well. Instrumented garment 54 typically senses the position, orientation, and/or flexure of the associated body part relative to computer 42 or some other reference point and communicates the data via computer 42 to central control unit 14. Central control unit 14 uses the data from head position sensor 53 and instrumented garment 54 to define a virtual being within the virtual space. The virtual being may take the form of another human being, an animal, machine, tool, inanimate object, etc., all of which may be visible or invisible within the virtual space. The position, orientation, and/or flexure data from the sensors may be used to emulate the same position, orientation, and/or flexure of the defined virtual being, or else the data may be used to control some other action. For example, if the user is defined as a virtual automobile within the virtual space, then position of the user's hand may be used to control acceleration whereas flexure of one or more of the user's fingers may be used to steer the automobile. Additionally, the data may be used to define multiple virtual beings. For example, data from head position sensor 53 may be used to define an aircraft carrier, and data from instrumented garment 54 may be used to define an aircraft.

Although head-mounted display 46, earphones 50, microphone 52, head position sensor 53 and instrumented glove 54 are shown attached to computer 42 through wires, any or all of these elements may be controlled by radio frequency or other wireless technologies.

In the preferred embodiment, head mounted display 46 displays the portion of the virtual space viewed from the perspective of the virtual being defined for user 18 together with all other defined virtual beings and objects within its field of vision. Each user may talk to and interact with other virtual beings and objects in the virtual space as the user desires, subject to constraints noted below when discussing the concepts of relevant spaces.

FIG. 2 is a block diagram of a particular embodiment of central control unit 14. Central control unit 14 includes a processor 100, a database memory 104 for storing virtual space data, an input telephone interface 108 for receiving data from the users, an output telephone interface 112 for communicating data to the users, a position/control data receiver 116 for receiving position, motion and control data from the users, a sound data receiver 120 for receiving sound information from the users, a position/control data transmitter 124 for communicating position, motion and control data to the users, a sound data transmitter 128 for communicating sound data to the users, a perspective monitor 132 for monitoring the visual perspectives of the virtual beings defined in database 104, a timer 136, a database update unit 140 for updating database 104 with data received from the users (and other program controlled changes), a virtual object control unit 144 for controlling virtual objects defined in database 104, an update communication control unit 148 for controlling the communication of updated data to the users, and a sound control unit 152 for processing sound data.

Data communicated by output telephone interface 112 to the users may comprise any data defining the virtual space together with the appropriate control information. For example, the data may comprise graphics data for rendering the virtual space, position/motion data for implementing moving objects within the virtual space, sound data, etc. In the preferred embodiment, however, graphics data per se is not communicated on an interactive basis. Instead, each user's computer has a copy of the entire virtual space (e.g., background, objects and primitives), and the data defining the virtual space communicated to the users comprises only position, motion, control, and sound data. After initial position, motion, control and sound data is communicated to the users, only changes in the position, motion, control and sound data is communicated thereafter. This dramatically reduces bandwidth requirements and allows the system to operate with many concurrent users without sacrificing real-time realism.

In the preferred embodiment, database 104 stores data for multiple virtual spaces. FIG. 3 is a block diagram showing one possible embodiment of database 104. Database 104 may contain a CAD virtual space 160 which allows users to engage in computer aided design, a game virtual space 164 which allows users to play a game, a task virtual space 168 which allows users to manipulate virtual objects to perform a particular task, and other virtual spaces. Central control unit 14 allows the user to interactively communicate with the virtual space either alone or in collaboration with other users. Each virtual space includes identification information 170, 172, 174, etc. so that users may specify which virtual space they intend to interact with.

Figure 5:
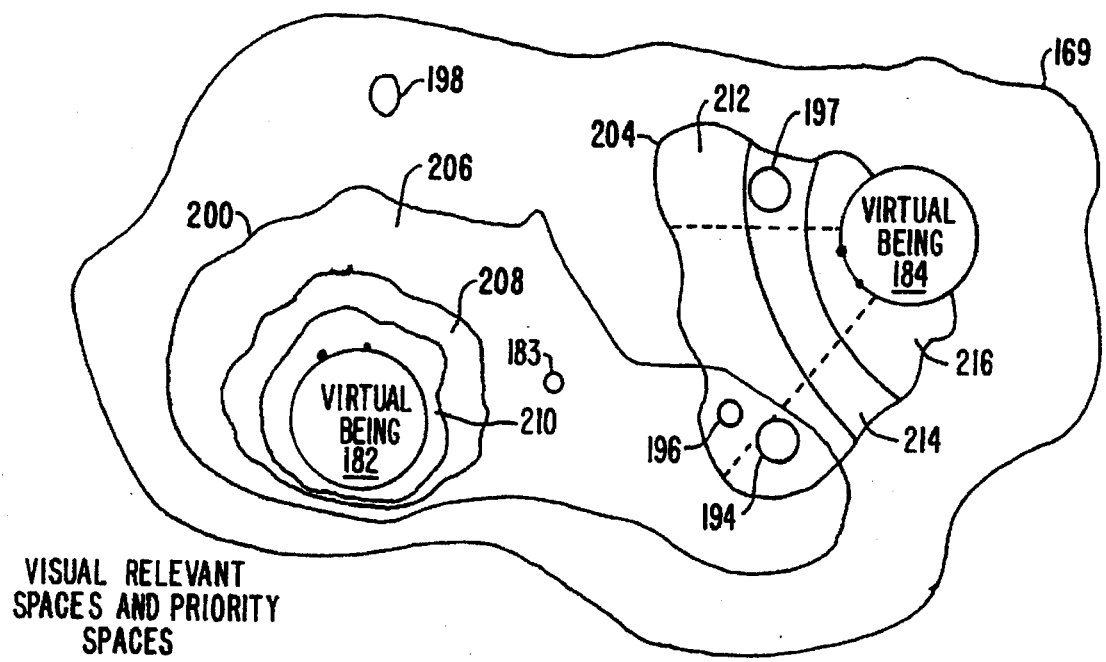
FIG. 5 is a diagram illustrating the concepts of visual relevant spaces and priority spaces within the virtual space.

FIG. 4 is a diagram of a particular embodiment of a virtual space 169. Virtual space 169 may include a plurality of virtual beings such as virtual beings 182, 183, and 184, sound origins 186, 188, 190, and 192, a movable virtual object 194, other virtual objects 196, 197 and 198, and graphics primitives 199A–F. Graphics primitives 199A–F may be used by any user to create further virtual objects if desired. To provide maximum flexibility and to facilitate communication with the users, each virtual being, and hence each user, is assigned a visual relevant space which determines which data defining the virtual space may be perceived by the user. In the context of the preferred embodiment, visual relevant spaces determine which state changes are communicated to (or perceivable by) the users. Of course, in other embodiments the visual relevant space may include all the graphical information encompassed by the boundaries of the visual relevant space. FIG. 5 is a diagram showing how the concepts of visual relevant spaces are applied to virtual beings 182 and 184 of FIG. 4. Virtual being 182 is assigned a visual relevant space 200, and virtual being 184 is assigned a visual relevant space 204. Virtual beings 182 and 184 may view only those elements (objects or states changes) which are disposed within their visual relevant spaces. For example, elements 194 and 196 and/or their motion may be visible to both virtual beings 182 and 184; element 197 and/or its motion may be visible only to virtual being 184; element 183 and/or its motion may be visible only to virtual being 182, and element 198 and/or its motion may be visible to neither virtual, motion being 182 nor virtual being 184. In the preferred embodiment which communicates only position, control and sound data to the users, those elements outside of a visual relevant space may be visible to the user, but any real-time or program controlled position/motion associated with the element is not processed for that user so that the element appears stationary in a fixed position, or else the element moves in accordance with a fixed script. The visual relevant space may be fixed as shown for virtual being 182. Alternatively, the user's visual relevant space may be defined by the field of view of the virtual being and areas in close proximity to it (as with virtual being 184), in which case the visual relevant space may move about the virtual space as the perspective or position of the virtual being changes. Visual relevant spaces need not be contiguous and need not have a direct spatial relationship to the virtual space. For example, a visual relevant space may include a virtual object without the accompanying background.

Each visual relevant space may be further subdivided into one or more Visual priority spaces. For example, visual relevant space 200 may include visual priority spaces 206, 208, and 210, and visual relevant space 204 may include visual priority spaces 212, 214, and 216. In the preferred embodiment, visual priority spaces may be used to determine the update frequency of elements located within them. For example, the position and orientation of elements 183, 194 and 196 may be updated very frequently (e.g., at 30 Hz), whereas the position and orientation of element 197 may be updated less frequently (e.g., at 1 Hz). Alternatively, visual priority spaces closer to the user may be updated more frequently than other visual priority spaces. This reduces the amount of data that must be communicated to each user while maintaining realism of important elements. Since many virtual objects are designed to move about the virtual space, they may cross into different priority spaces over time and be processed accordingly. The change from one priority space to another may be continuous or discrete as desired.

Figure 6:
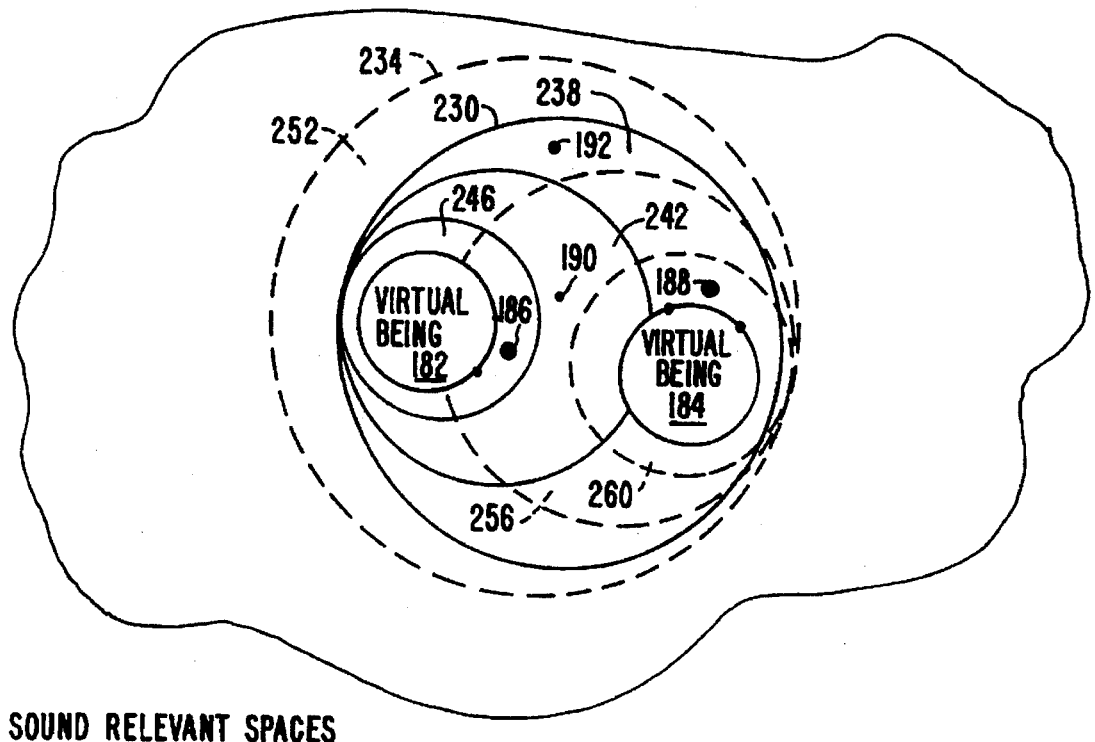
FIG. 6 is a diagram illustrating the concepts of sound relevant spaces and sound priority spaces within the virtual space.

Relevant spaces also may be defined for sound data. FIG. 6 is a diagram illustrating the concept of sound relevant spaces. Virtual being 182 has a sound relevant space 230 associated with it, and virtual being 184 has a sound relevant space 234 (indicated by a dashed line) associated with it. Only sound sources disposed within a virtual being's sound relevant space (and/or changes in the sounds) may be perceived by that being, and hence the corresponding user. In this case, sound sources 186, 188, 190, and 192 and/or their changes may be perceived by both virtual beings 182 and 184. It should be noted that sound sources associated with an element which cannot be visually perceived by a virtual being may nevertheless be heard by the virtual being. Such may be the case with element 183 associated with sound source 192. If so, while only virtual being 182 may see the element, both virtual beings 182 and 184 may hear it. It should also be noted that sound relevant spaces, like visual relevant spaces, need not be contiguous and need not have a direct spatial relationship to the virtual space.

Sound priority spaces may also be defined for each sound relevant space. As shown in FIG. 6, sound relevant space 230 includes sound priority spaces 238, 242, and 246, and sound relevant space 234 includes sound priority spaces 252, 256, and 260. In this embodiment, the amplitude of the sound source perceived by the virtual being depends upon which sound priority space the sound source is located.

Thus, virtual being 182 may perceive sound source 186 louder than sound source 190, and sound source 190 louder than sound sources 188 and 192. Similarly, virtual being 184 may perceive sound source 188 louder than sound sources 186 and 190, and sound source 186 and 190 louder than sound source 192. Sound priority spaces also may be defined to set the update frequency of the sound data. Since sound origins may move along with virtual objects to which they are attached, a given sound may cross into different sound priority spaces over time and be processed accordingly. The change from one sound priority space to another may be continuous or discrete as desired.

Input telephone interface unit 108 (FIG. 2) receives input data from the users through the telephone network and communicates control data and positional data such as that from the users' head position sensors and instrumented garments (e.g., position, orientation and/or movement) to position/control data receiver 116 through a communication path 156. Sound data received from the users (e.g., from their microphones) is communicated to sound data receiver 120 through a communication path 160. Position/control data receiver 116 and sound data receiver 120 communicate with processor 100 through communication paths 161 and 163, respectively. Processor 100 maps the position, orientation and/or movement data from each user to corresponding virtual beings within the requested virtual space in database 104. Control data received from the users may be used to establish the telephonic communication with central control unit 14, to specify a desired virtual space, to specify the type of virtual being the user wishes to assume, and possibly how the positional data is to be mapped to the selected virtual being, to create virtual objects (using graphics primitives 199A-F), to specify visual and sound relevant spaces and their corresponding priority spaces, etc. Sound data received from the users may be associated with the virtual beings defined for those users or assigned in some other manner. For example, sound data from one of the users may be assigned to a virtual public address system for announcing the beginning of a race in which that user and other users compete.

Processor 100 updates database 104 with the received position, motion, control, and sound data, determines which user is to receive which data according to the relevant and priority spaces defined for that user, communicates position, motion and control information to position/control data transmitter 124 through a communication path 162, and communicates sound data to sound data transmitter 128 through a communication path 164. Position/control data transmitter 124 and sound data transmitter 128 communicate with output telephone interface 112 through respective communication paths 168 and 172 for sending the data to the users.

Perspective monitor 132 monitors the defined field of view of each virtual being to determine the visual state change data to be communicated to the users. As noted above, in the preferred embodiment, each user has a copy of the selected virtual space in his or her computer, and processor 100 periodically sends only the positional and sound data assigned to points within the user's relevant space or field of view to the user so that the user's computer may update the images viewed and sounds heard with the new positional and sound data. To further reduce the amount of data communicated to the users, which updated data is sent to the user at a particular time may be determined by the priority space in which the object or sound is located. Thus, data for updating objects or sounds in one priority space may be communicated thirty times per second, whereas data for updating objects or sounds in another priority space may be communicated once per second.

In another embodiment of the invention, processor 100 may communicate all graphical data associated with the relevant space or field of view of the virtual being to the corresponding user and then instruct update communication control unit 148 to send updated data as appropriate. For example, processor 100 may use the positional data from the user's head position sensor to determine the position of the head of the virtual being defined for that user and communicate the graphical data for that portion of the relevant space to the user. As the user moves about, processor 100 receives new positional data, and database update unit 140 uses that data to update the position (and hence the field of view) of the corresponding virtual being in database 104. Perspective monitor detects the occurrence of a selected event and then instructs update communication control unit 148 to communicate the graphical data for the updated field of view to the user. The event which triggers the communication of the updated data to the users may be the passage of a selected time interval measured by timer 136. Alternatively, perspective monitor 132 may instruct update communication control unit 148 to send the updated data when the position of the user's head changes by a selected amount, or it may rely upon the occurrence of some other variance in the data received from the user.

Virtual object control unit 144 defines or maintains the virtual objects within database 104 and assigns the position, orientation, and/or movement data received from the user to the virtual objects. For example, data designating flexure and position of the user's legs, arms, fingers, etc. may be assigned to the virtual being's legs, arms, fingers, etc. so that the virtual being may emulate the gestures of the user for running, kicking, catching virtual balls, painting, writing, etc. Of course, as noted above, the virtual being defined or maintained by virtual object control unit 144 need not be humanoid and it may be specified by the user using primitives 199A-F in any desired combination. The position, orientation, and/or movement data received from a user may be assigned to one or more visible or invisible objects as the imagination allows. Virtual object control unit 144 also may define or maintain program-generated and controlled virtual objects within the virtual space. For example, virtual object control unit 144 may define or maintain a virtual volley ball or a virtual satellite which moves in accordance with program-defined constraints such as range of motion, speed, gravitational forces, etc.

Sound control unit 152 defines the origin and nature of sounds within the virtual space and assigns the sound data received from the users to them. The simplest example of the assignment of sounds is the assignment of a user's voice to the voice of the corresponding virtual being. The voice of the virtual being may track the user's voice exactly, or else sound control unit 152 may vary the pitch or timbre of the voice accordingly. The user's voice also could be changed to emulate the chosen virtual being. For example, the user's voice could be changed to emulate a frog or jet aircraft, with the amplitude of the user's voice being used to control the amplitude of the virtual sound. Sound control unit 152 also may assign program-defined sounds to the virtual space. For example, sound control unit may generate the sound accompanying a program-generated aircraft randomly passing through the virtual space. Sound control unit also controls the characteristics (e.g., amplitude, update frequency, etc.) of the virtual sounds according to the sound priority spaces in which the sounds are located.

Finally, sound control unit 152 also may control the perceived spatial positioning of the sound within the virtual space. The user transmits to central control unit 14 monophonic speech which is processed by an mixer within sound control unit 152. The mixer combines all the sounds received by the various users and transmits the sounds located within a user's sound relevant space to that user. Amplitude may be determined by the sound priority space in which the sound origin is located and/or based on how loud a user is talking (or some other dynamically alterable rule). The data communicated by sound data transmitter 128 may include data to direct the user's hardware to pan, in real time, the incoming monophonic signal across its stereo outputs, thus creating the illusion of stereo audio to enhance the sensation of immersion within the virtual space without increasing communications bandwidth requirements between the user and the system.

Figure 7:
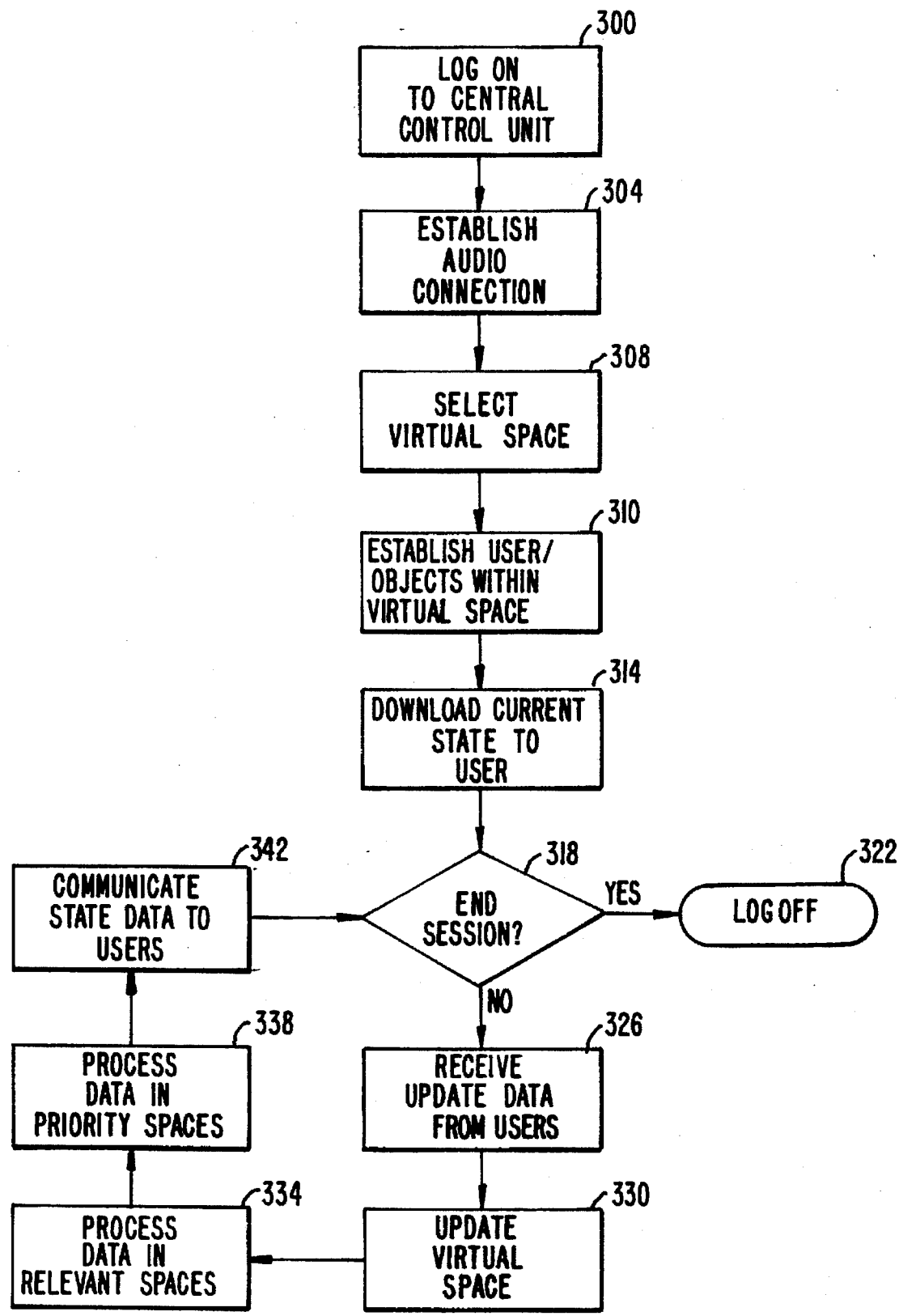
FIG. 7 is a flowchart showing operation of the virtual reality network according to the present invention.

Operation of one embodiment of the system is illustrated in FIG. 7. The user initially logs on to central control unit 14 in a step 300 using a conventional modem and serial line concentrator coupled to a telephone line which functions as a data line. The user's computer transmits identification codes along the data line to begin the logon sequence. Once the data line connection has been established, the user's computer establishes a second connection with the system, using a second telephone line, to establish the audio connection in a step 304. This is done by transmitting a unique series of DTMF codes along the second telephone line to central control unit 14 to inform central control unit 14 which audio line is to be correlated to which data line. This is important, since the incoming lines to central control unit 14 most likely originate from a telephone company rotary switch, and without the DTMF identifiers the system would not know which audio line corresponds to which data line. Once the second connection is established, the user connection to the system is complete.

Once the connection is established, the user transmits data to central control unit 14 to select which virtual space the user desires to interact with in a step 308. This data also may include mapping information specifying virtual objects within the virtual space and how the position, motion, and sound data is to be mapped within the selected virtual space. The data also may include relevant and priority space information as well as information which enables central control unit 14 to create virtual objects from graphical primitives. Central control unit 14 then establishes the user, relevant spaces, priority spaces and any specified virtual objects within the virtual space in a step 310. At the same time central control unit 14 searches for other users in the same universe. If other users are found, central control unit 14 calculates the proximity of the other users (and their defined virtual objects) based on XYZ coordinate differentials. Once the coordinate differentials are calculated, locations of the other users and their defined virtual objects within and without the relevant and priority spaces may be determined and used to ascertain which position, motion and sound data is transmitted to which user in a step 314. In this manner position, motion and sound data is not transmitted to users that would not be able to use that data at that point in time.

It is then ascertained in a step 318 whether the session is to be terminated. If so, the user is logged off the system in a step 322. If not, central control unit 14 continues to receive position, motion, and sound data (together with any other commands) from the various users in a step 326, updates the virtual space in a step 330, calculates coordinates and processes the data in the various relevant spaces in a step 334, processes the data in the various priority spaces in a step 338, communicates the updated state data to the various users in a step 342 (based on the relevant and priority spaces for each user), and continues in step 318.

While the above is a detailed description of a preferred embodiment of the present invention, various modifications may be employed. Consequently, the scope of the invention should be ascertained by the following claims.

What is claimed is:

1. An apparatus for allowing a plurality of users to interact with a virtual space, the apparatus comprising:

a database defining a three-dimensional virtual space;

communication means for establishing a communication between the database and each of the plurality of users;

data communicating means for communicating data from the database to each of the users, wherein the communicated data comprises data regarding the virtual space;

means for receiving position data corresponding to positions of each of the users;

means for updating the database in response to received position data that differs from earlier-received position data;

means for defining virtual beings corresponding to each of the users within the virtual space, the virtual beings having respective positions within the virtual space correlated to the position data received from the corresponding users;

means, responsive to the position data, for defining visual relevant spaces in the virtual space corresponding to each of the users, at least some of the users having respective visual relevant spaces that are less than the entire virtual space with at least one user's visual relevant space being defined by a portion of the virtual space viewed from the perspective of that user's virtual being so as to exclude an angular range of the virtual space;

means, associated with at least a particular user's visual relevant space, for defining a plurality of visual priority spaces within the particular user's visual relevant space;

means, associated with the data communicating means and responsive to changed position data from the users, for communicating updated position information regarding each given user's virtual being to other users, but only to those other users having visual relevant spaces within which the given user's virtual being is located; and means, associated with the means for communicating updated position information, for communicating updated data corresponding to virtual beings in a given one of the visual priority spaces in priority over updated data corresponding to virtual beings within other visual priority spaces within the particular user's visual relevant space.

2. The apparatus according to claim 1 further comprising:
means for defining a movable first virtual object within the virtual space; and
means for allowing at least one virtual being to manipulate the first virtual object.

3. The apparatus according to claim 1 wherein:
the database defines a plurality of virtual spaces,
the apparatus further comprises means for receiving identifying data from each user for identifying one of the plurality of virtual spaces, and
the data communicated by the data communicating means to each user corresponds to the identified virtual space.

4. The apparatus according to claim 1 wherein each user's visual relevant space is defined by a portion of the virtual space viewed from the perspective of that user's virtual being.

5. The apparatus according to claim 1 further comprising:
means for defining a virtual sound within the virtual space; and
virtual sound communicating means, associated with the data communicating means, for communicating, to each of the users, data correlated to the virtual sound.

6. The apparatus according to claim 5 wherein:
the means for defining a virtual sound includes
means for assigning a sound origin to the virtual sound within the virtual space,
means, responsive to the position data, for defining sound relevant spaces in the virtual space corresponding to each of the users, at least some of the users having respective sound relevant spaces that are less than the entire virtual space; and
the sound communicating means communicates the data correlated to the virtual sound to a given user only if the sound origin is located within the given user's sound relevant space.

7. An apparatus for allowing a plurality of at least first and second users to interact with a virtual space, the apparatus comprising:

a database defining a three-dimensional virtual space;

means for establishing a communication between the database and each of the plurality of users;

means for receiving position data corresponding to positions of each of the users;

means for updating the database in response to received position data that differs from earlier-received position data;

means for defining virtual beings corresponding to each of the users within the virtual space, the virtual beings having respective positions within the virtual space correlated to the position data received from the corresponding users;

means, responsive to the position data, for defining visual relevant spaces in the virtual space corresponding to each of the users, at least some of the users having respective visual relevant spaces that are less than the entire virtual space with at least one user's visual relevant space being defined by a portion of the virtual space viewed from the perspective of that user's virtual being so as to exclude an angular range of the virtual space;

means, associated with the data communicating means and responsive to changed position data from the users, for communicating updated position information regarding each given user's virtual being to other users, but only to those other users having visual relevant spaces within which the given user's virtual being is located;

first sound receiving means for receiving data corresponding to a first sound from the first user;

first sound origin assigning means for assigning a first sound origin to the data corresponding to the first sound within the virtual space;

second sound receiving means for receiving data corresponding to a second sound from the second user;

second sound origin assigning means for assigning a second sound origin to the data corresponding to the second sound within the virtual space;

first sound relevant space defining means for defining a first sound relevant space in the virtual space corresponding to the first virtual being wherein the first sound relevant space includes a plurality of first sound priority spaces;

second sound relevant space defining means for defining a second sound relevant space in the virtual space corresponding to the second virtual being;

first sound communicating means for communicating, to the first user, data correlated to sounds having their origin only within the first sound relevant space wherein the first sound communicating means includes first amplitude varying means for communicating, to the first user, data for varying the amplitude of sounds within the first sound relevant space depending upon the sound priority space in which the sounds have their origin; and second sound communicating means for communicating, to the second user, data correlated to sounds having their origin only within the second sound relevant space.

8. The apparatus according to claim 7 wherein the first sound communicating means further comprises first sound position emulating means for communicating, to the first user, data for emulating the spatial origin of sounds within the first sound relevant space.

9. The apparatus according to claim 8 wherein the second sound communicating means further comprises second sound position emulating means for communicating, to the second user, data for emulating the spatial origin of sounds within the second sound relevant space.

10. The apparatus according to claim 7 wherein the second sound relevant space includes a plurality of second sound priority spaces, and wherein the sound communicating means includes second amplitude varying means for communicating, to the second user, data for varying the amplitude of sounds within the second sound relevant space depending upon the sound priority space in which the sounds have their origin.

11. A method of allowing a plurality of users to interact with a three-dimensional virtual space, the method comprising:

providing a computer system having a database defining the virtual space;

providing each user a bidirectional communication channel with the computer system;

providing each user a visual display device;

providing each user a position sensing device that generates position information representing that user's position;

communicating each user's position information to the computer system;

for each user, defining a virtual being within the virtual space, the virtual being having a position within the virtual space correlated to that user's position information;

operating the computer system to perform the steps of:
  for each user, defining a visual relevant space that depends on position information from that user, at least one user's relevant space being defined by a portion of the virtual space viewed from the perspective of that user's virtual being so as to exclude an angular range of the virtual space;

for at least a particular user, defining a set of visual priority spaces within the particular user's visual relevant space; and in response to changes in position information from a given user, communicating updated position information regarding the given user's virtual being to each other user only if the given user's virtual being is located within that other user's visual relevant space, wherein said updated position information regarding the given user's virtual being is communicated to the particular user at different time intervals depending on the visible priority space in which the given user's virtual being is located.

12. A method of allowing a plurality of users to interact with a three-dimensional virtual space, the method comprising:

providing a computer system having a database defining the virtual space;

providing each user a bidirectional communication channel with the computer system;

providing each user a visual display and a sound display device;

for each user, generating position information representing that user's position and communicating that user's position information to the computer system;

for each user, generating sound information representing sounds initiated by that user and communicating that user's sound information to the computer for each user, defining a virtual being within the virtual space, the virtual being having a position within the virtual space correlated to that user's position information;

operating the computer system to perform the steps of:
  for each user, defining a visual relevant space that depends on position information from that user, at least one user's visual relevant space being defined by a portion of the virtual space viewed from the perspective of that user's virtual being so as exclude an angular range of the virtual space;
  for each user, communicating to that user updated position information regarding other users' virtual beings only for those other users whose virtual beings are located within that user's visual relevant space;
  for each user, defining a sound relevant space that depends on position information from that user;
  for at least a particular user, defining a set of sound priority spaces within the particular user's sound relevant space;
  for each user, combining sound information from only those other users whose virtual beings are in that user's sound relevant space, and communicating the combined sound information to that user; and
  for at least the particular user, determining relative amplitudes of sounds from the other users in said combining step depending on the sound priority space in which each other user's virtual being is located.

13. The method of claim 12, comprising operating the computer system to perform the additional steps of:

for at least a particular user, defining a set of visual priority spaces within the particular user's visual relevant space; and communicating the updated position information regarding the given user's virtual being to the particular user at different time intervals depending on the visible priority space in which the given user's virtual being is located.

14. The method of claim 12 wherein the sounds initiated by at least one user include voice.

15. The method of claim 12 wherein said step of combining sound information for a given user includes weighing amplitudes of other users' virtual beings' sounds according to the positions of the other users' different virtual beings relative to the given user's virtual being.

* * * * *